Sept. 26, 1972 C. F. WHEATLEY, JR Re. 27,492
TELEVISION DEFLECTION SYSTEM INCLUDING AFC CIRCUIT WITH REGENERATIVE PHASE DETECTOR
Original Filed Oct. 3, 1966
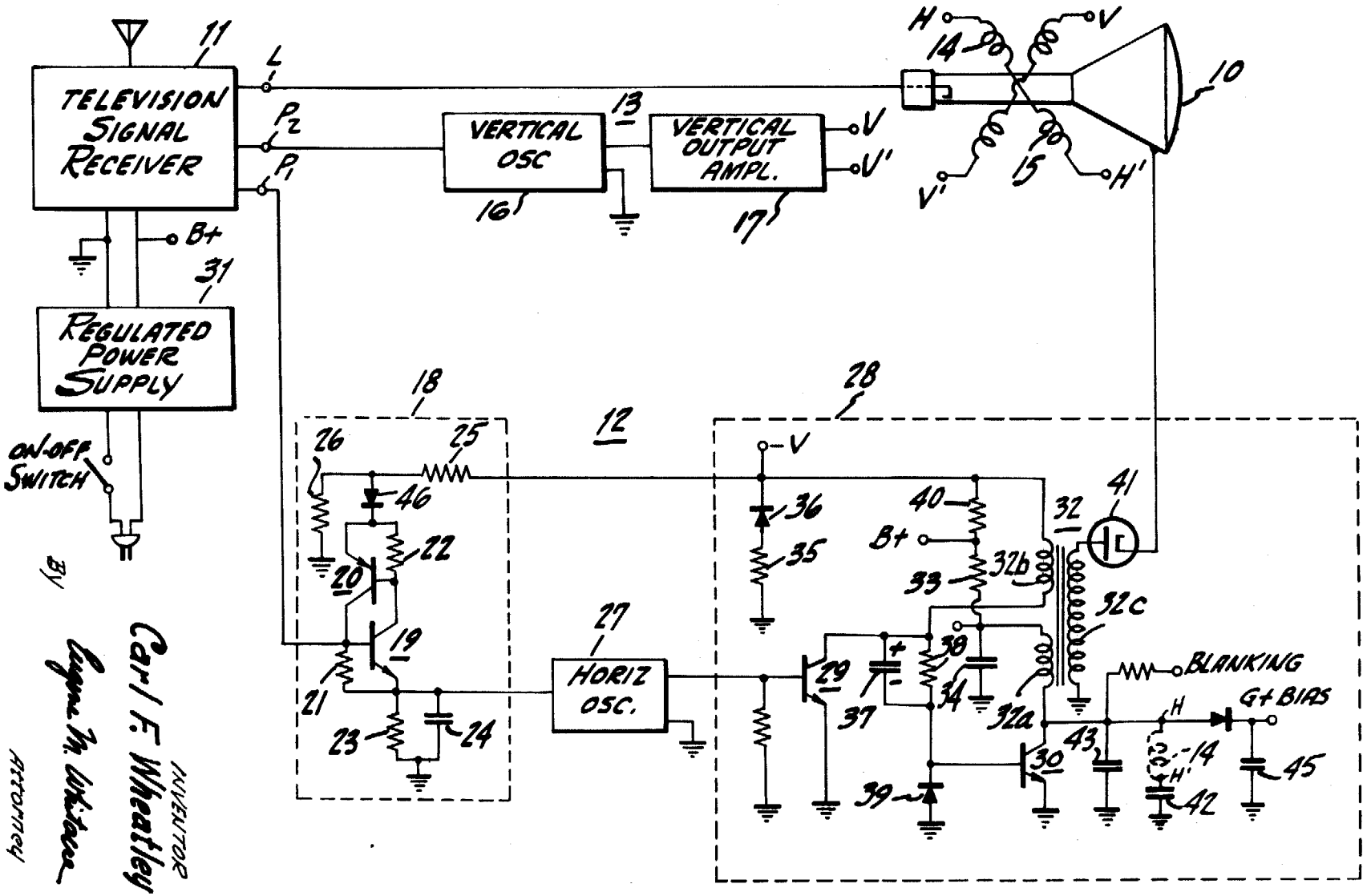
INVENTOR
Carl F. Wheatley
By Eugene M. Whitacre
Attorney United States Patent Office Re. 27,492
Reissued Sept. 26, 1972

27,492

TELEVISION DEFLECTION SYSTEM INCLUDING AFC CIRCUIT WITH REGENERATIVE PHASE DETECTOR

Carl Franklin Wheatley, Jr., Somerset, N.J., assignor to RCA Corporation

Original No. 3,441,673, dated Apr. 29, 1969, Ser. No. 583,609, Oct. 3, 1966. Application for reissue Dec. 8, 1970, Ser. No. 96,298
Int. Cl. H04n *3/16, 5/04*
U.S. Cl. 178—69.5 TV 14 Claims

Matter enclosed in heavy brackets [ ] appears in the original patent but forms no part of this reissue specification; matter printed in italics indicates the additions made by reissue.

*ABSTRACT OF THE DISCLOSURE*

*A horizontal deflection circuit for a television receiver includes an AFC circuit utilizing two transistors of opposite conductivity type coupled in a regenerative configuration. A reference signal and a sync signal are supplied to the transistors to produce the requisite oscillator control signal for AFC purposes. A deflection waveform generating circuit is also disclosed. The latter circuit utilizes an output transistor coupled to a deflection winding and a diode coupled in series with the base-collector circuit of the transistor to provide damping for reverse deflection coil current.*

This invention relates to television deflection circuits and in particular to a transistor horizontal deflection waveform generating circuit which includes automatic frequency control means, a self-driving deflection output stage and an associated high voltage circuit for producing the high direct accelerating voltage required for operation of the kinescope in a television receiver.

In a commonly employed approach to the design of transistor horizontal deflection circuits, the output stage (which supplies current to a deflection winding) is supplied with input powder by a transformer coupled driver stage, which is in turn controlled by an oscillator stage. The operating sequence is arranged such that the driver stage normally is conductive while the output stage is non-conductive and the converse is also true. In such a circuit, the energy needed to drive the output stage during its conductive mode is stored in the driver coupling transformer. The driver stage and coupling transformer as well as the output stage in such a configuration must be designed to handle substantial power (the output stage requirements being greater).

In accordance with the present invention, the power required to drive the horizontal deflection output stage is derived from the output circuit of the output stage and is fed back to the input of that stage, thereby providing a self-driving or self-oscillating output stage. A switching or trigger stage precedes and is directly coupled to the input circuit of the output stage for switching the output stage between conductive and non-conductive states. An oscillator, under the control of a regeneratively coupled pair of switching transistors serving as a relatively noise immune automatic frequency control circuit, provides triggering signals to the trigger stage to maintain the operation of the deflection waveform generating output stage in timed relation with respect to horizontal synchronizing pulses applied to the automatic frequency control circuit.

A primary object of the present invention therefore is to provide an improved transistor horizontal deflection circuit.

A further object of the present invention is to provide an improved automatic frequency control circuit for use in conjunction with a horizontal deflection waveform generating circuit.

The novel features that are considered characteristic of this invention are set forth with particularity in the appended claims. This invention itself, however, both as to its organization and method of operation as well as additional objects thereof will best be understood from the following description when read in connection with the accompanying drawing.

In the drawing, the circuits of a television receiver serving to provide signals to energize an image reproducing device such as a kinescope 10, are represented by a single block 11 labelled "TV Signal Receiver." Receiver unit 11 incorporates the usual elements required to provide video signals (at output terminal L) for intensity modulation of the electron beam of kinescope 10, as well as to provide suitable synchronizing pulse information (at terminals $P_1$ and $P_2$) to synchronize, in respective horizontal and vertical deflection circuits 12 and 13, the energization of the respective windings 14 and 15 of a deflection yoke associated with kinescope 10.

Vertical synchronizing pulses are supplied from terminal $P_2$ to vertical deflection circuit 13 which includes a vertical oscillator stage 16 and a vertical output stage 17. The output terminals V, V' associated with vertical output stage 17 are coupled to the similarly labelled terminals V, V' of vertical deflection winding 15 associated with kinescope 10.

Horizontal synchronizing pulses are applied from terminal $P_1$ to an automatic frequency control (AFC) circuit indicated generally by the dotted rectangle 18. AFC circuit 18 comprises first and second complementary transistors 19 and 20 coupled together in a regenerative feedback circuit. Biasing resistors 21 and 22 are associated respectively with the input (base-emitter) circuits of transistors 19 and 20. The emitter electrode of transistor 19 (an NPN device) is returned to ground by means of a high frequency noise filter comprising the parallel combination of a resistor 23 and a capacitor 24. Horizontal deflection flyback pulses, as will be explained below, are coupled to the emitter electrode of transistor 20 by means of the combination of a voltage divider comprising resistors 25 and 26 and a blocking diode 46.

A correction signal representative of the relative time occurence of the applied synchronizing and flyback pulses is applied from AFC circuit 18 to a horizontal oscillator 27 which may, for example, be of the multivibrator type. The output of horizontal oscillator 27 is, in turn, coupled to a horizontal deflection waveform and high voltage generating circuit indicated generally by the dotted rectangle labelled 28. Generating circuit 28 comprises a trigger stage 29 and an output stage 30. The output terminals H, H' associated with horizontal output stage 30 are coupled to the similarly labelled terminals H, H' of the horizontal deflection winding 14 associated with kinescope 10.

In accordance with one aspect of the present invention, horizontal output stage 30 is arranged in a self-oscillating configuration. Specifically, a source of B+ operating voltage, shown as a regulated power supply 31, is coupled to the collector electrode of horizontal output stage 30 (shown as an NPN transistor) by means of the primary winding 32a of a horizontal output transformer 32 and a decoupling network comprising a resistor 33 and a capacitor 34. A feedback winding 32b provided on transformer 32 to render output stage 30 self-oscillating is coupled to the base-emitter circuit of output stage 30 by means of the circuit path comprising a resistor 35, a diode 36, winding 32b and the parallel combination of a capacitor 37 and a resistor 38. A diode 39 is coupled between the base electrode of output stage 30 and ground and is poled for conduction in the same direction as the forward conduction direction of the base-collector junction of output stage 30. A starting resistor 40 is coupled from the B+ terminal to a point in the base-emitter circuit path of output stage 30, e.g., to the junction of winding 32b and diode 36.

A high voltage winding 32c and a high voltage rectifier 41 are provided for supplying the required high accelerating voltage (e.g. +20,000 volts) to the final anode or ultor of kinescope 10.

The horizontal deflection winding 14 is coupled in series with a relatively large capacitor 42 across the output terminals (collector-emitter) of horizontal output stage 30. A retrace capacitor 43 is also coupled across such output terminals. A voltage clamping circuit comprising the combination of a diode 44 and a storage capacitor 45 is also coupled across such terminals to provide protection for output stage 30 against large voltage excursions. The voltage developed across capacitor 45 advantageously may be employed to supply one of the elements (grids) of kinescope 10. A blanking pulse may be obtained at the output (collector electrode) of output stage 30.

Flyback or retrace pulses developed across winding 32b, as was mentioned above, are coupled back to AFC circuit 18 via resistors 25 and 26 and diode 46 to synchronize the operation of horizontal oscillator 27 with the occurrence of the horizontal synchronizing pulses provided at terminal $P_1$.

In the operation of the horizontal deflection circuit 12, horizontal oscillator 27 is arranged to provide a recurring square wave for alternately switching trigger stage 29 between conductive and non-conductive states during each deflection cycle. Specifically, in the illustrated circuit, where the horizontal deflection cycle is 63.5 microseconds in duration, oscillator 27 preferably is arranged to provide a recurring waveform characterized by a positive, relatively constant voltage commencing at the beginning of the retrace interval and extending for approximately 30 microseconds followed by a negative, relatively constant voltage for the remainder of the deflection cycle. Trigger stage 29 (an NPN transistor), to which the above-described square wave is applied, is thereby turned "on" to commence retrace and is turned "off" prior to the middle of trace. As stage 29 is switched "on," output stage 30, as will appear below, is switched "off" and retrace is initiated. When stage 29 is switched "off," output stage 30 is conditioned for conduction. The operation of the self-oscillating output stage 30 and associated components now will be described. Initially, when the receiver is turned on and the B+ supply voltage is developed, current is supplied via starting resistor 40, winding 32b and the parallel combination of capacitor 37 and resistor 38 to the input (base-emitter) circuit of output stage 30. Capacitor 37 charges to a voltage of the polarity indicated on the drawing during this interval. At the same time, a positive voltage is supplied from the B+ supply via resistor 33, capacitor 34 and winding 32a to the collector electrode of stage 30. Stage 30 therefore commences conduction supplying an increasing current to deflection winding 14 and capacitor 42. Windings 32a and 32b are phased one with respect to the other such that as conduction increases in output stage 30 and the voltage across that stage drops to saturation level, the voltage across winding 32b increases causing an increasing drive current to be supplied to the input (base-emitter) circuit of stage 30. The drive current circuit is completed by resistor 35 and diode 36, the latter being poled for conduction of the necessary drive current.

Oscillator 27 is operating at this time and, upon the occurrence of a change in the oscillator output from a positive to a negative voltage, trigger stage 29 is driven rapidly into saturation conduction (fully "on"). The drive current supplied via winding 32b, resistor 35 and diode 36 is then switched from the base-emitter circuit of output stage 30 to the collector-emitter circuit of trigger stage 29. At the same time, the voltage developed across capacitor 37 is coupled by means of trigger stage 29 across the input circuit of output stage 30 with such polarity as to render output stage 30 non-conductive. Capacitor 30 thereafter discharges through trigger stage 29 and diode 39. Diode 39 serves to maintain a reverse voltage across the input of output stage 30, thereby maintaining stage 30 non-conductive as long as trigger stage 29 is conductive.

When output stage 30 is rendered non-conductive, the energy previously supplied to deflection winding 14 is exchanged in a resonant manner primarily between winding 14 and retrace capacitor 43. The natural resonant period of these components is selected to provide substantially one-half cycle of oscillation (i.e. reversal of current in deflection winding 14) during the desired retrace interval. As the current in winding 14 passes through substantially one-half cycle of oscillation, the voltage between the collector and emitter electrodes of output stage 30 passes through a corresponding oscillatory variation (i.e. a half-sinusoidal positive flyback voltage pulse is produced). When the voltage at the collector electrode of output stage 30 exceeds the B+ supply voltage, the voltage across winding 32b of transformer 32 is of such a polarity as to support a current in a direction opposite to that supplied as input drive to stage 30. However, diode 36 is poled to block such reverse current flow. It should also be noted that diode 36 is poled such as to oppose current supplied via starting resistor 40.

Upon the completion of approximately one-half cycle of oscillation between deflection winding 14 and retrace capacitor 43, the voltage at the collector electrode of output stage 30 swings sufficiently negative to forward bias the collector-base junction of stage 30. Retrace ends and the trace portion of the succeeding deflection cycle then commences. The collector-base junction of output stage 30, in cooperation with the similarly poled diode 39, then serves as a "damper" diode and provides a circuit path for the substantially linearly declining current in deflection winding 14 during the first half of the trace portion of the deflection cycle. Prior to the time at which the current in deflection winding 14 reaches zero, the output of oscillator 27 changes from a positive to a negative voltage, thereby driving trigger stage 29 out of conduction into cutoff. Capacitor 37 is charged as shown in the drawing prior to initiation of forward conduction in output stage 30. Approximately midway through the trace portion of the deflection cycle the current in deflection winding 14 declines to zero. The current coupled to the input circuit of stage 30 via winding 32b supplies drive and initiates forward conduction in stage 30. The current in deflection winding 14, which is now supplied by output stage 30, continues to increase substantially linearly until the succeeding retrace interval is initiated by oscillator 27.

It should be noted that the B+ supply voltage (e.g. +100 volts) is supplied to output stage 30 via decoupling network 33, 34. Typically, the circuit parameters may be chosen such that, for zero beam current in kinescope 10 (i.e. minimum high voltage loading), the voltage appearing at the junction of resistor 33 and capacitor 34 is +85 volts. When the beam current in kinescope 10 increases, the extra power (current) required in the deflection and high voltage generating circuit will cause the voltage at the junction of resistor 33 and capacitor 34 to decrease. Both the high voltage supplied to kinescope 10 and the deflection current supplied to deflection winding 14 therefore will decrease. At the same time, the high voltage may be permitted to decrease further as a result of the loading effect on the high voltage supply of the increased beam current. Such variations may be controlled one with respect to the other such that image size in the horizontal direction remains constant as beam current changes. Decoupling network 33, 34 is selected to accomplish such a result. Furthermore, the vertical deflection circuit 13 may be supplied from the junction of resistor 33 and capacitor 34 to maintain vertical image size substantially constant as beam current (brightness) changes in kinescope 10.

In the design of transistor horizontal deflection circuits, particular attention must be directed to reliable operation under abnormal conditions (e.g. arcing in the high voltage generating circuit). In the illustrated circuit, protection in the form of diode clamp 44 and capacitor 45 is provided against excessive voltages appearing at the collector electrode of output stage 30. Capacitor 45 is selected sufficiently large to absorb excessive energy which may be expected to appear at the output collector electrode during the occurrence of arcing in the high voltage generating circuit.

A further degree of circuit protection is provided by means of decoupling network 33, 34 described above. Consistent with the conditions previously described above for maintaining image size constant as kinescope beam current varies, the values of resistor 33 and capacitor 34 may be selected to provide a relatively "soft" supply voltage for output stage 30. That is, resistor 33 is selected to limit to a reasonable value the maximum power which may be transferred into the horizontal deflection and high voltage generating circuits. Furthermore, capacitor 34 is selected of sufficiently small value such that when large power (current) requirements are placed upon the B+ supply by the horizontal deflection circuit 12 (e.g. during high voltage arcing), the supply voltage across capacitor 34 rapidly decreases. As this supply voltage decreases,the regenerative action of transformer 32 causes the drive to the input (base-emitter) circuit of stage 30 to decrease. This action can result in stage 30 shutting off (becoming non-conductive), thereby avoiding excessive power dissipation and failure of output stage 30. Furthermore, stage 30 may be shut off by a similar regenerative action if the output (collector) current is increased sufficiently to take stage 30 out of saturation.

A negative voltage supply (e.g. —5 volts) may be developed by coupling a filter network (R-C) from the terminal labelled —V to ground if required for operation of other portions of the receiver.

The operation of AFC circuit 18 now will be described as it relates to the operation of the previously described portions of the horizontal deflection circuit 12. Specifically, as was stated above, transistors 19 and 20 are complementary (i.e. of opposite type conductivity) and are arranged in a regenerative configuration. Thus, if transistor 19 is suplied with a positive pulse at its base electrode and, at the same time, transistor 20 is conditioned for conduction (e.g. by application of a positive voltage to its emitter electrode), transistor 19 will supply current to the base of transistor 20 which will amplify such current and resupply the amplified current to the base of transistor 19. This regenerative action rapidly drives both transistors 19 and 20 into saturation and they remain so until, e.g. the voltage at the emitter of transistor 20 is reversed, shutting off the pair. The duration of conduction is a measure of the relative timing of the signals applied to transistors 19 and 20. In the specific circuit shown, positive horizontal flyback or retrace pulses developed across resistor 35 and diode 36 are coupled via divider 25, 26 and blocking diode 46 to the emitter of transistor 20. Horizontal synchronizing pulses are applied to the base of transistor 19. The two transistors 19 and 20 remain conductive during that portion of the retrace interval succeeding the occurrence of a sync pulse. In a typical circuit, the sync pulse may be arranged to occur 3 to 4 microseconds after the start of retrace and conduction continues in AFC circuit 18 until the end of retrace. The conductive interval is selected according to the requirements for maintaining oscillator 27 locked to the horizontal scanning frequency (15,750 cycle/second).

AFC circuit 18 is relatively immune to noise since the gating interval exists only between the beginning of retrace and the occurrence of the leading edge of the horizontal sync pulse (e.g. a total gating interval of 3 to 4 microseconds). When both of transistors 19 and 20 are in saturation conduction, noise has substantially no effect on the output of AFC circuit 18. Similarly, the effects of vertical equalizing pulses and the effects of the serrations in the vertical pulses (e.g. pulling of the top edge of the picture) are substantially eliminated by the described configuration. High frequency noise (high relative to the horizontal deflection frequency) is further filtered by means of resistor 23 and capacitor 24.

What is claimed is:

1. In a television receiver, the combination comprising
   - means for providing a source of synchronizing pulse signals,
   - a deflection waveform generating circuit for producing a recurring deflection waveform including trace and retrace portions,
   - oscillator means coupled to said generating circuit for supplying a triggering signal thereto timed to initiate each said retrace portion prior to the occurrence of a corresponding synchronizing pulse.
   - means coupled to said generating circuit for providing a reference pulse signal during said retrace portion,
   - an automatic frequency control circuit including first and second gating signal responsive means coupled respectively to said reference pulse signal means and to said synchronizing pulse signal means,
   - said first gating signal responsive means being conditioned for conduction by said reference pulse signal,
   - said second gating signal responsive means being similarly conditioned by said synchronizing pulse signal,
   - means for coupling said first and second gating signal responsive means together in a regenerative configuration such that said automatic frequency control circuit provides a control signal representative of the time occurrence of said synchronizing pulse signal with respect to said retrace portion, and
   - means for supplying said control signal to said oscillator.

2. In a television receiver, the combination according to claim 1 wherein
   - said reference pulse signal means provides a reference pulse signal substantially co-extensive in duration with said retrace portion,
   - said first and second gating signal responsive means thereby being rendered conductive throughout that part of each retrace portion succeeding the occurrence of a synchronizing pulse.

3. In a television receiver, the combination according to claim 2 wherein
   - said first and second gating signal responsive means comprise first and second transistors of opposite type conductivity coupled directly together in a regenerative configuration.

4. In a television receiver, a defletcion waveform generating circuit for producing a recurring deflection waveform including trace and retrace portions, the generating circuit comprising
   - a deflection output stage having input terminals and output terminals,
   - a deflection winding coupled to said output terminals,
   - a voltage supply,
   - a transformer having a primary winding coupling said voltage supply to said output terminals and a regenerative feedback winding coupled to said input terminals for providing power input to said output stage,
   - trigger means coupled to said input terminals for selectively decoupling said feedback winding from said input terminals, and
   - means for supplying periodic signals to said trigger means alternatingly to decouple said feedback winding from and to couple said feedback winding to said input terminals for initiating said retrace portion and for supplying power to said deflection winding, respectively.

5. In a television receiver, a deflection waveform generating circuit according to claim 4 and further comprising unidirectionally conductive circuit means coupled in series with said feedback winding and poled to permit conduction in said feedback winding only in a direction to supply power to said output stage.

6. In a television receiver, a deflection waveform generating circuit according to claim 5 wherein said output stage comprises an output transistor having base, emitter and collector electrodes, said input terminals comprising said base and emitter electrodes, said output stage comprises an output transistor havemitter electrodes, and the collector-emitter circuit of said output transistor is rendered conductive during the latter half of each trace portion to supply current to said deflection winding while the collector-base circuit thereof is rendered conductive during the first half of each trace portion.

7. In a television receiver, a deflection waveform generating circuit according to claim 6 and further comprising a diode coupled in series relation with said collector-base circuit of said output transistor across said deflection winding and poled for conduction of current from said deflection winding during the first half of each trace portion.

8. In a television receiver, a deflection waveform generating circuit according to claim 7 and further comprising the parallel combination of a resistor and a capacitor coupled in series relation between said feedback winding and said input terminals and further coupled in series relation between said trigger stage and said input terminals.

*9. In a television receiver, a deflection waveform generating circuit for producing a recurring deflection waveform including trace and retrace portions, the generating circuit comprising*

*an output transistor having base, emitter and collector electrodes,*

*a deflection winding coupled to said collector and emitter electrodes, and*

*a diode coupled in series with the base-collector circuit of said output transistor on the base side and poled for conduction in the same direction as the forward conduction direction of the base-collector junction of said output transistor, said diode providing a direct current conducting path external to said transistor for providing the damping function for reverse deflection coil current, which reverse current passes through said base-collector circuit in the forward direction.*

*10. In a television receiver, a deflection waveform generating circuit according to claim 9 and further comprising*

*input signal means coupled to said base and emitter electrodes of said output transistor for rendering the collector-emitter circuit of said transistor conductive during the latter half of each trace portion,*

*said diode and base-collector junction being poled for conduction of current from said deflection winding during the first half of each trace portion.*

*11. In a television receiver, a deflection waveform generating circuit according to claim 10 wherein*

*said input signal means is arranged for rendering the collector-emitter path of said output transistor nonconductive to initiate the retrace portion of each deflection waveform.*

*12. In a television receiver, a deflection waveform generating circuit for producing a recurring deflection waveform including trace and retrace portions, the generating circuit comprising*

*an output transistor having base, emitter and collector electrodes;*

*a deflection winding coupled to said collector and emitter electrodes; and*

*direct current conductive means coupled in series with the base-collector circuit of said output transistor on the base side, said direct current conductive means providing a conducting path external to said transistor for providing the damping function for reverse deflection coil current, which reverse current passes through said base-collector circuit in the forward direction.*

*13. In a television receiver, a deflection waveform generating circuit according to claim 12 and further comprising:*

*input signal means coupled to said base and emitter electrodes of said output transistor for rendering the collector-emitter circuit of said transistor conductive during the latter half of each trace portion,*

*said base-collector junction being poled for conduction of current from said deflection winding during the first half of each trace portion.*

*14. In a television receiver, a deflection waveform generating circuit according to claim 13 wherein*

*said input signal means is arranged for rendering the collector-emitter path of said output transistor nonconductive to initiate the retrace portion of each deflection waveform.*

References Cited

The following references, cited by the Examiner, are of record in the patented file of this patent or the original patent.

FOREIGN PATENTS 1,184,794 1/1965 Germany -------- 315—27 TD

OTHER REFERENCES

"Pulse Generator," Fulcher, RCA Tech. Note 636, August 1965.

ROBERT L. RICHARDSON, Primary Examiner

U.S. Cl. X.R.

315—27 TD

UNITED STATES PATENT OFFICE

CERTIFICATE OF CORRECTION

Patent No. Re. 27,492 Dated September 26, 1972

Inventor(s) Carl Franklin Wheatley, Jr.

It is certified that error appears in the above-identified patent and that said Letters Patent are hereby corrected as shown below:

Column 2, line 45, that portion reading "occurence" should read -- occurrence --. Column 5, line 50, that portion reading "suplied" should read -- supplied --. Column 7, lines 17 and 18, that portion reading "said output stage comprises an output transistor hav- emitter electrodes," should read -- said output terminals comprising said collector and emitter electrodes, --.

Signed and sealed this 1st day of May 1973.

(SEAL)
Attest:

EDWARD M. FLETCHER, JR.
Attesting Officer

ROBERT GOTTSCHALK
Commissioner of Patents

USCOMM-DC 60376-P69
☆ U.S. GOVERNMENT PRINTING OFFICE : 1969 O—366-334

Disclaimer

Re. 27,492.—*Carl Franklin Wheatley, Jr.*, Somerset, N.J. TELEVISION DEFLECTION SYSTEM INCLUDING AFC CIRCUIT WITH REGENERATIVE PHASE DETECTOR. Patent dated Sept. 26, 1972. Disclaimer filed Mar. 27, 1974, by the assignee, *RCA Corporation*.

Hereby enters this disclaimer to claims 9, 10, 11, 12, 13 and 14 of said patent.

[*Official Gazette May 27, 1975.*]